Dec. 9, 1947.                R. J. KIRCHER                2,432,100
                    TWO-WAY SIGNAL TRANSMISSION SYSTEM
                  Filed Jan. 22, 1945           3 Sheets-Sheet 1
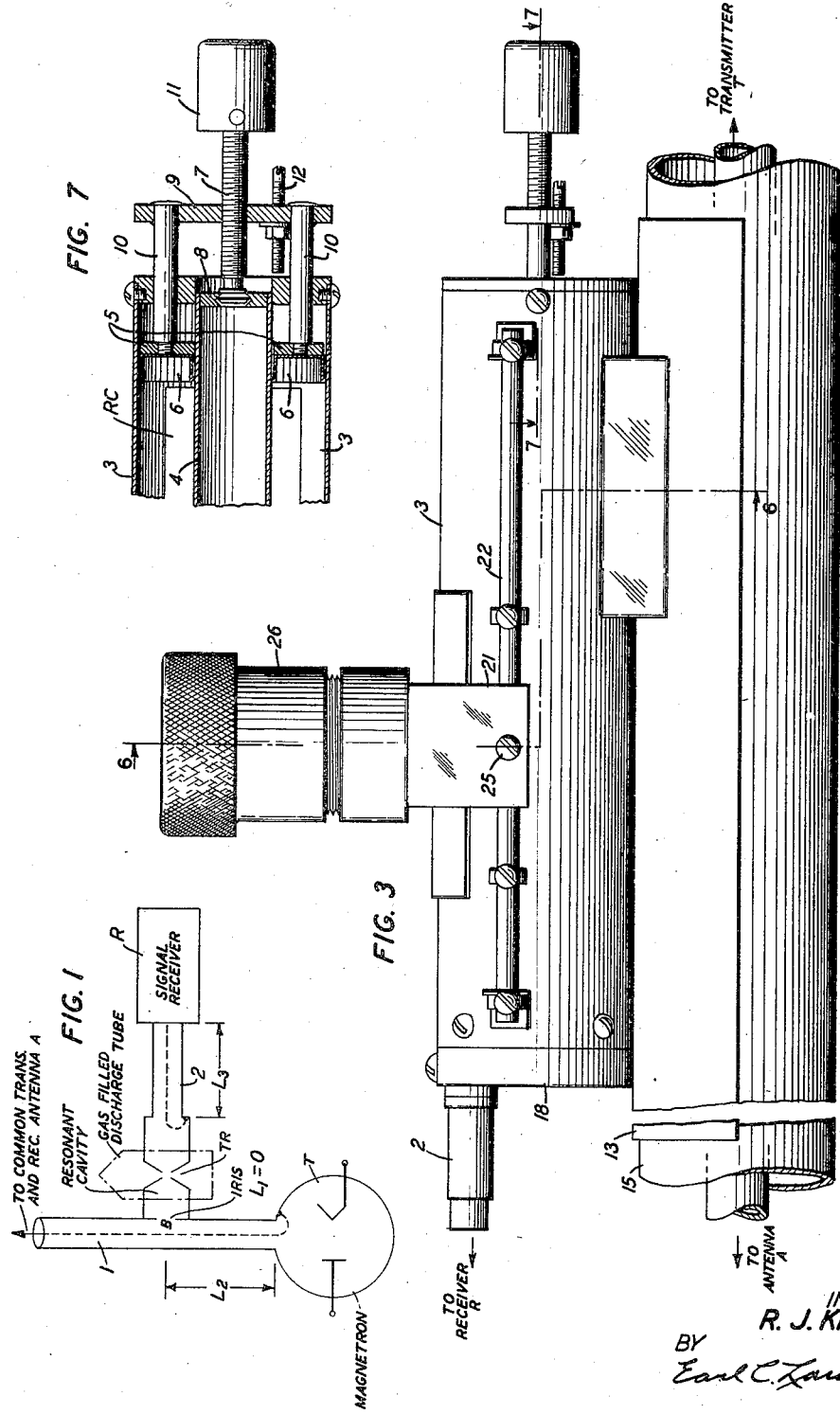
INVENTOR
R. J. KIRCHER
BY
Earl C. Laughlin
ATTORNEY

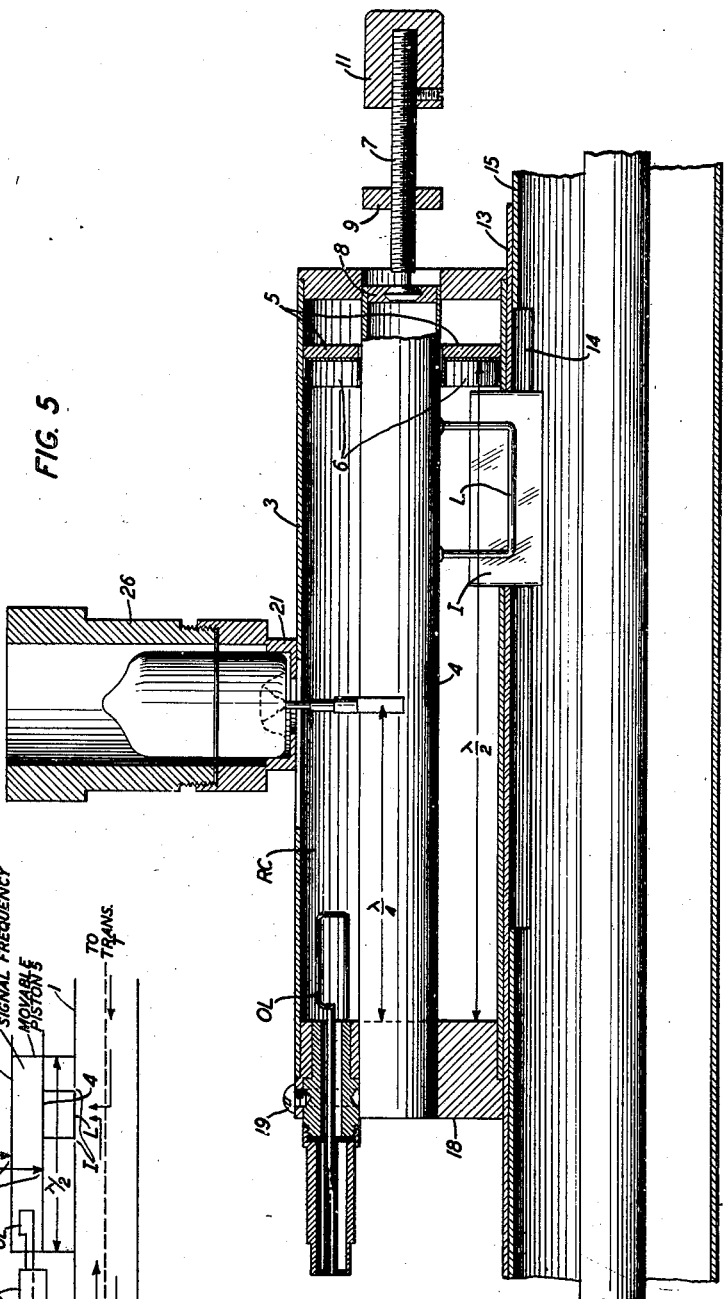

Dec. 9, 1947.  R. J. KIRCHER  2,432,100
TWO-WAY SIGNAL TRANSMISSION SYSTEM
Filed Jan. 22, 1945  3 Sheets-Sheet 3

INVENTOR
R. J. KIRCHER
BY
ATTORNEY

Patented Dec. 9, 1947

2,432,100

UNITED STATES PATENT OFFICE 2,432,100

TWO-WAY SIGNAL TRANSMISSION SYSTEM

Reymond J. Kircher, Neptune, N. J., assignor to Bell Telephone Laboratories, Incorporated, New York, N. Y., a corporation of New York Application January 22, 1945, Serial No. 574,011

5 Claims. (Cl. 250—13)

1

The invention relates to a two-way signal wave transmission system, and particularly to a coupling and switching arrangement employed at a terminal of such a system for providing proper two-operation where the signal transmitting and receiving circuits are coupled to the two-way signal transmission medium through a common transmission device, such as an antenna.

Although the coupling and switching arrangements of the invention are applicable to the terminals of any wire or radio signal transmission system of the duplex type, employing such a common transmitting and receiving device, it is particularly adapted for and will be described as applied to an object locating system of the pulse reflection type, for example, one employing ultra-high frequency or radio waves, commonly called a radar system. In the usual radar system, very short pulses of high frequency signal energy are generated and radiated at frequent intervals through an antenna at an observation point into a surrounding air wave transmission medium; return pulses, which may be termed radio echoes, reflected from objects to be located in the transmission medium, on which the radiated pulses impinge are picked up by the same antenna and are detected in an associated tuned signal receiver; and the detected pulses are compared on a time basis in a suitable measuring or indicating circuit with the outgoing signal pulses so as to provide a measure of the distances to the objects causing the echoes. Proper operation of such a system requires the use of extremely sensitive wave detection apparatus in the radar receiver, for example, crystal detectors, which may be destroyed or have their operation substantially impaired if subjected to high voltages such as would be necessarily employed for the outgoing signal pulses in such a radar system.

General objects of the invention are to insure that the signal receiver in such a radar system or duplex signaling terminal is protected from the necessarily high voltages of the outgoing signal wave energy during signal transmitting intervals; that the incoming signal wave energy is applied to the signal receiver with relatively little loss; that there is a minimum of attenuation between the signal transmitter or transmitting pulse generator and the antenna or other common transmitting and receiving device; and that reflections at the common point of connection of the signal transmitter and signal receiver to the circuit or line leading to the antenna or other common transmitting and receiving device are reduced to a minimum.

2

For accomplishing these general objects, the copending patent application of A. L. Samuel, Serial No. 474,122, filed January 30, 1943, discloses the use of an arrangement employing a hollow chamber or cavity resonant to the incoming and outgoing signal frequencies, with an associated shunting gas discharge tube, operating as a transmit-receive switch, and a so-called "series" branching connection of the signal transmitter and signal receiver to the line leading to the antenna or other common transmitting and receiving device. In one disclosed embodiment, a coaxial line is employed for connecting the signal transmitter to a common transmitting and receiving antenna and the resonant cavity-gas discharge tube switch is connected between the signal receiver and the line at a suitably located branching point and is directly coupled to that line by a window or iris in the outer conductor of the latter, this switch operating in response to the applied portion of the high voltage outgoing signal energy passing over the coaxial line towards the antenna during signal transmitting intervals, to reduce the signal input to the receiver to an unobjectionable amount, while allowing substantially all of the relatively low voltage incoming signal energy received over that line from the antenna, to enter the receiver during signal receiving intervals.

A specific object of the present invention is to improve a switching and coupling arrangement of the latter type, particularly from the standpoint of adapting it for use over a given range of signal frequencies, and for providing a desired amount of insertion loss to the low level received signals without any substantial detrimental effect on its switching operation in response to the high level outgoing signals.

The above objects are attained in accordance with the present invention by a modified switch and coupling arrangement of the above-described general type, including the use of a half-wave section of coaxial line shorted at its two ends as a cavity resonator, which is directly coupled near one end to a coaxial line connecting the signal transmitter or transmitted pulse generator to the common transmitting and receiving antenna, by mated apertures or irises in their contacting outer conductors so as to provide the series type of branching connection, and is coupled to the line leading to the signal receiver by a pick-up loop at one end of the cavity resonator. The short at one end of the cavity resonator is provided by a plunger or piston movable therein to adjust the tuning of the resonator over the desired range of signal wavelengths. A shunting gas discharge tube connected between the outer and inner conductors of the coaxial resonator is mounted on a movable seat to enable adjustment of the position of the shunt to the exact electrical center of the resonator for each tuning adjustment.

A feature of the invention is a suitable small metal loop connected to the inner conductor of the coaxial resonator at a point adjacent the input iris and operating in conjunction with that iris to provide a desired low insertion loss of fixed value to the low level received signals.

Various objects and features of the invention will be better understood from the following detailed description when read in conjunction with the accompanying drawings in which:

Fig. 1 shows schematically a radar system or duplex signal transmission system terminal of a type to which to which the invention is applicable;

Fig. 2 shows schematically a portion of the sytem of Fig. 1 including a simplified showing of a coupling and switching arrangement illustrating diagrammatically the various features of the invention;

Figure 6:
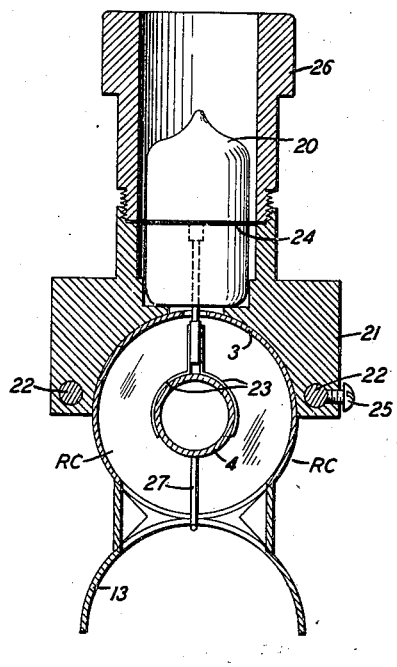
Figure 4:
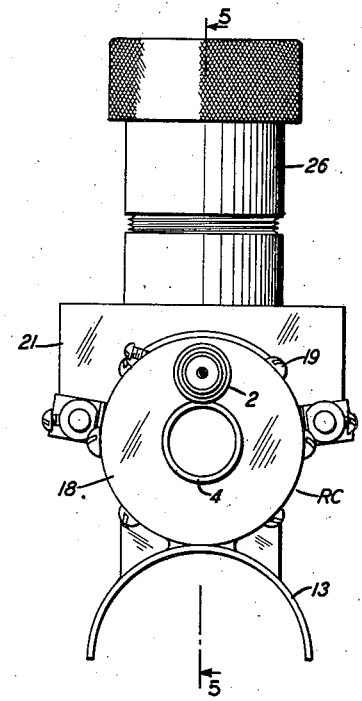
Figure 8:
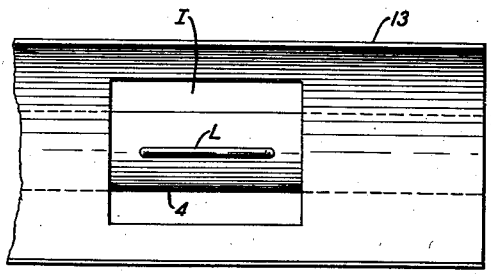

Fig. 3 shows a front elevation assembly view, drawn full scale, of a practical embodiment of the coupling and switching arrangement of the invention; and Figs. 4 to 8 show respectively an end view of the assembly of Fig. 3; a sectional view along the line 5—5 of Fig. 4; sectional views along the lines 6—6 and 7—7 of Fig. 3; and a bottom view of a structural detail of the assembly of Fig. 3 to be described.

Fig. 1, which corresponds to Fig. 2 of the aforementioned copending patent application of A. L. Samuel, shows a radar system or duplex signaling system terminal of the general type to which the invention is applicable. As shown, it includes a signal transmitter T, which may be of the magnetron type such as disclosed, for example, in the U. S. patent of A. L. Samuel, No. 2,063,343, issued December 8, 1938, adapted for generating recurring wave pulses of ultra-high frequency. Transmitter T is connected by a main line 1, which may be a section of coaxial line having the usual inner and outer concentric conductors, as indicated, to a common transmitting and receiving antenna A. A signal receiver R of any suitable type is connected through a second section of line 2, the transmit-receive switch TR and a portion of the main line 1, in order, to the common antenna A. The switch TR, illustrated diagrammatically in Fig. 1, comprises a hollow chamber or cavity suitably dimensioned so as to be resonant to the frequency of the outgoing signals generated by transmitter 1 and of the incoming signals received from antenna A, and a gaseous discharge tube shunted across the chamber at a maximum impedance point. The input of the resonant chamber of the switch TR is coupled to the main line 1 through a window or iris in the outer conductor of the latter at a suitably located branching point B to provide the "series" type of connection, which requires that the distance $L_1$ between the input of the resonant chamber and the branching point B be equal to zero or an even number of quarter-wavelengths in order that the receiver branching impedance at that point be made small. The output of the resonant chamber of the TR switch may be coupled to the receiver line 2 in any suitable manner.

During signal transmitting intervals, the high voltage signal energy flows from transmitter T along the main line 1 toward the antenna A. A portion of this wave energy is diverted at the branching point B through the iris into the input of the resonant chamber of the TR switch, building up a resonant voltage across the shunting gas tube sufficient to cause its discharge to provide a low impedance shunt path across the chamber. This effectively detunes the chamber, reducing the energy input of the resonant frequency to the receiver R to a low value. (The transmission loss of the device is very high in this state.) The length $L_3$ of line 2 between the output of the resonant cavity of the switch TR and the receiver R is selected, or the line is so terminated, as to provide the proper impedance matching to give maximum protection of the receiver R from the high voltage of the transmitted pulses. At the end of each transmitted pulse the internal impedance of the magnetron transmitter T rapidly changes providing a decided mismatch with the characteristic impedance of the main line 1. To the incoming signal pulses received over the line 1 from the antenna A, the transmitter T then appears as an equivalent shorting plunger the position of which with respect to the branching point B may be adjusted by changing the length $L_2$. With the distance $L_2$ properly selected, substantially all of the incoming signal energy may be made to enter the resonant chamber of the TR switch at the point B through the input iris. The relatively low resonant voltage of this incoming signal energy, applied across the gas tube of the switch TR wil be insufficient to cause the gas tube to break down, so that the chamber will be maintained tuned to transmit the received signals to the receiver R with little loss.

In the system of Figs. 3 to 7, the coupling and switching arrangement in accordance with the invention, as illustrated diagrammatically in Fig. 2, includes a chamber RC suitably dimensioned so as to be resonant to the frequency of the incoming and outgoing signals, formed by a half-wavelength ($\lambda/2$) section of coaxial line having outer and inner concentric conductors 3 and 4, respectively, closed (shorted) at its two ends, the closure at one end being provided by a piston 5 movable along the inner and outer coaxial conductors to adjust the effective length and thus the tuning of the resonant chamber RC to the desired signal frequency. This coaxial resonator is mounted on the face of the outer conductor of the main coaxial line 1 connecting the signal transmitter T to the common transmitting and receiving antenna A with the longitudinal axis of the former parallel to that of the line 1. Electrical coupling between the coaxial resonator RC and the coaxial line 1 is provided by an iris opening I through their contacting outer conductors at a point near the movable end of the former, and electrical coupling between the resonant chamber RC and the signal receiver R is provided by an output pick-up loop OL near the nonmovable end of the former connecting through the end wall to the inner and outer conductors of the coaxial line 2 leading to the receiver. A gas discharge tube is connected between the outer conductor 3 and inner conductor 4 of the coaxial resonator by contacts adapted for slidable movement therealong to adjust its shunting position to the exact electrical center ($\lambda/4$ point) for each tuning adjustment provided by the movable piston 5. A suitable small loop L is affixed to the inner conductor 4 of the coaxial resonator at a point adjacent the input iris I, operating in conjunction with that iris to provide a desired insertion loss of a fixed low value.

A full scale model of a practical embodiment of the coupling and switching arrangement in accordance with the invention having the features shown diagrammatically in Fig. 2 is illustrated in Figs. 3 to 8 of the drawings. As shown in the latter figures, this arrangement includes a resonant chamber RC formed by a half-wavelength ($\lambda/2$) section of 53-ohm coaxial line having an outer concentric conductor 3 and an inner concentric conductor 4, which is closed (shorted) at its two ends. The short at the right end of this cavity is provided by the movable ring-shaped plunger or piston 5 held in contact with the outer conductor 3 and inner conductor 4 of the coaxial resonator by the spring contact fingers 6. The piston 5 is adapted for longitudinal movement to the right or left to adjust the effective length of and thus the tuning of the resonant cavity RC over a desired range of signal wavelengths. This movement of the piston 5 is imparted by the screw 7 journaled in the end block 8 of the resonant cavity RC and threaded through the external block 9 which is connected in fixed spaced relation with the piston 5 by the rods 10, when the knob 11 at the end of the screw 7 is rotated to the right or left. The extent of this longitudinal movement of the piston 5 in the direction from right to left is limited by the stop screw 12 threaded through the block 9 and arranged to make contact with the end block 8 when the piston 5 has been moved a given distance along the coaxial resonator.

The coaxial resonator RC is fixedly attached to a sector of pipe 13 adapted for sliding along a portion including a longitudinal slot 14, of the outer conductor 15, of the main coaxial transmission line 1 which connects the transmitter T to the common transmitting and receiving antenna A in the system of Fig. 1 to adjust the length $L_2$ of line between the transmitter and the branching point B. Coupling to the transmission line 1 is made by means of a small rectangular-shaped opening or iris I formed by an aperture in the outer conductor 3 of the coaxial resonator RC near its movable shorted end, and a correspondingly situated aperture in the sliding contacting pipe sector 13, and the adjacent longitudinal slot 14, in the outer conductor 15, of the coaxial line 1. Coupling of the resonant chamber RC to the signal receiver R is effected by means of a small metal pick-up loop OL, located within the cavity near its non-movable shorted end. This loop is connected to a plug which passes through the end block 18 and allows the loop to be connected to the inner and outer concentric conductors of the external coaxial line 2 extending to the receiver R. The loop OL is adapted for rotation with the concentric conductors of line 2, to the position which will provide optimum coupling of the receiver to the chamber, and is maintained clamped in that position by the set screw 19 extending into a groove in the end block 18.

The point of maximum impedance in the resonant cavity RC occurs half-way between the two ends of the shorted $\lambda/2$ section of coaxial line, or at the $\lambda/4$ point. Here provision is made for mounting a gas tube type of discharge device 20 between the outer conductor 4 and the inner conductor 5 of the coaxial resonator. To enable the adjustment of the point of connection of the gas tube 20 to the exact electrical center, or ($\lambda/4$) point, of the resonant cavity RC, for each tuning adjustment provided by the longitudinal movement of the end piston 5 to change the effective length of the cavity, the tube 20 is mounted on a movable seating block 21. The latter block is adapted for longitudinal movement in either direction along the external rods 22 to slide the spring contact terminals 23 and 24 of the tube longitudinally along the outer surfaces of the outer conductor 3 and of the inner conductor 4, respectively, of the coaxial resonator. The set screw 25 is used for clamping the seating block 21 to one of the rods 22 when the shunting gas discharge tube has been adjusted to the desired position. The metal shell 26 is screwed into the seating block 21 to provide a protective housing for the gas tube 20. This shell is unscrewed to provide ready access to the tube 20 so that it may be replaced with a new tube, if necessary.

A properly-dimensioned small metal loop L is attached to the inner conductor 4 of the coaxial resonator at a point adjacent to the iris opening I coupling the resonant cavity RC to the main coaxial line 1. This loop L, not necessary for proper operation of the switch, is provided for permitting adjustment of the insertion loss to the low level incoming signals during signal receiving intervals to a given low value without altering the dimensions of the iris I. In general, the use of a coaxial resonant chamber is of particular value for the longer signal wavelengths where wave guide is impracticable because of the large size required. For a relatively small coaxial chamber (1½ inch diameter), an iris of excessive size may be required for certain wavelengths. The loop L enables less loss to be obtained with a given iris size than can be obtained without the loop. With the dimensions of iris I and loop L shown, an insertion loss in the order of one decibel can be obtained. This loss can be obtained by the iris alone by alteration of its dimensions, but this is not always either practicable or desirable. The loop L was found to cause no detrimental effect from the standpoint of reducing the transmission through the resonant cavity RC of the direct high power outgoing signal energy.

The coupling and switching arrangements illustrated in Fig. 2 and Figs. 3 to 8 operates in a manner similar to that described in connection with the system of Fig. 1 for the corresponding transmit-receive switch TR, to effectively short-circuit the input of the signal receiver R in response to the high voltage outgoing signal energy of the frequency to which the resonant cavity is tuned, during signal transmitting intervals, and to cause substantially all of the relatively low voltage incoming signal energy of that frequency to be transmitted to the signal receiver R during signal receiving intervals.

Various other modifications of the arrangement illustrated and described which are within the spirit and scope of the invention will occur to persons skilled in the art.

What is claimed is:

1. In combination in a signal wave transmission system, a source of alternating signal waves, a section of coaxial line having inner and outer concentric conductors, closed at its two ends to provide a chamber resonant at a frequency determined by its dimensions, a piston providing the closure at one end of said line, adapted for movement along said inner and outer conductors to change the effective length and thus the tuning of said chamber to accommodate any one of a given range of frequencies which may be used for said signal waves, input coupling means for transmitting a given energy portion of the signal waves from said source into said chamber, output coupling means for abstracting from said chamber signal waves of the frequency to which it is resonant, a signal receiver supplied with the abstracted signal waves, a normally disabled electrical short-circuiting connection between said inner and outer conductors, adapted to be enabled in response to the signal energy entering said chamber, of an amplitude level above a predetermined value only, to effectively detune said chamber so as to reduce the signal energy output thereof to a desired low value, and means to adjust the position of said short-circuiting connection to the electrical center of said chamber for each tuning adjustment thereof.

2. The combination of claim 1, in which said source comprises a signal wave generator and an associated line having a tubular outer conductor contacting with the outer conductor of said chamber, for transmitting the generated signal waves, said input coupling means comprising mated iris openings in the contacting portions of said tubular line conductor and said outer conductor of said chamber near one end of the latter, said output coupling means comprising a pick-up loop within said chamber near its other end adapted for rotation to an optimum coupling position, and an associated external line feeding said receiver.

3. The combination of claim 1 in which said source comprises a signal wave generator and an associated line having a tubular conductor contacting with the outer conductor of said chamber, for transmitting the generated signal waves, said input coupling means comprising mated iris openings in the contacting portions of said tubular line conductor and said outer conductor of said chamber near one end thereof, and a suitably dimensioned metal loop connected to the inner conductor of said chamber at a point adjacent said mated iris openings, operating in conjunction with said iris openings to provide a desired small insertion loss of fixed value for the low level signal energy entering said chamber, without materially affecting the suppression in said chamber of signal wave energy above said predetermined level.

4. The combination of claim 1, in which said short-circuiting connection comprises a gas discharge device within said chamber, having terminals respectively contacting the inner and outer conductors thereof, said device being adapted to discharge to provide a low impedance shunt across said conductors in response to a voltage applied thereto by the signal energy input to said chamber, of an amplitude level above said predetermined value, and to remain undischarged to maintain the tuning of said chamber in response to the voltage applied thereto by the signal energy input to said chamber, of an amplitude level below said predetermined value, said position adjusting means comprising a mounting for said gas discharge device movable to slide the contacts of said device along said outer and inner conductors of said chamber to the desired position.

5. In combination in a signal duplexing system, a signal transmitter, a signal receiver, a common transmitting and receiving antenna, a main transmission line comprising a tubular conductor connecting said transmitter to said antenna, a half-wave section of coaxial line having inner and outer concentric conductors, shorted at both ends to provide a resonant chamber, a piston forming the short at one end of said chamber adapted for longitudinal movement along said inner and outer conductors to adjust the length and thus the tuning of said chamber over a given range of signal wavelengths, an iris opening in the contacting outer conductors of said tubular conductor and said resonant chamber near one end of the latter, providing electrical coupling therebetween at a predetermined distance from said transmitter, a pick-up loop within said chamber at the other end thereof, a second line connecting said signal receiver to said loop, a gas discharge device connected between said inner and outer conductors of said chamber, discharging to effectively short-circuit the input to said receiver in response to the resonant voltage built up thereacross by the portion of the outgoing signal energy directed from said main line into said resonant chamber through said iris, and being maintained in the undischarged condition in response to the lower resonant voltage applied thereacross by the portion of the relatively low level incoming signal energy entering said chamber through said iris, to enable transmission of that energy through said chamber and said second line to said receiver with little loss, and means for adjusting the point of connection of said gas discharge device across said inner and outer conductors of said chamber to the electrical center thereof for each tuning adjustment within said range of wavelengths.

REYMOND J. KIRCHER.

REFERENCES CITED

The following references are of record in the file of this patent:

UNITED STATES PATENTS

| Number | Name | Date |
|--------|------|------|
| 827,524 | Forest | July 31, 1906 |